United States Patent
Liu et al.

(10) Patent No.: US 10,959,239 B2
(45) Date of Patent: Mar. 23, 2021

(54) COMMUNICATION METHOD IN DIRECTIONAL COMMUNICATIONS SYSTEM, COMMUNICATIONS SYSTEM, AND RECEIVER

(71) Applicant: Huawei Technologies Co., Ltd., Shenzhen (CN)

(72) Inventors: Yang Liu, Shenzhen (CN); Yingpei Lin, Shanghai (CN); Shao-Yu Lien, Taiwan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/657,740

(22) Filed: Oct. 18, 2019

(65) Prior Publication Data

US 2020/0053737 A1 Feb. 13, 2020

Related U.S. Application Data

(63) Continuation of application No. PCT/CN2018/082262, filed on Apr. 9, 2018.

(30) Foreign Application Priority Data

Apr. 21, 2017 (CN) .......................... 201710267249.2

(51) Int. Cl.
*H04B 10/00* (2013.01)
*H04W 72/08* (2009.01)
(Continued)

(52) U.S. Cl.
CPC .... *H04W 72/082* (2013.01); *H04B 10/07953* (2013.01); *H04B 10/116* (2013.01); *H04W 72/048* (2013.01)

(58) Field of Classification Search
CPC ... H04B 10/116; H04B 10/112; H04B 10/114; H04B 10/1143; H04B 10/1149; H04B 10/07953; H04W 72/082; H04W 72/048
(Continued)

(56) References Cited

U.S. PATENT DOCUMENTS

2008/0144493 A1    6/2008  Yeh
2008/0192707 A1*   8/2008  Xhafa ............... H04W 74/0808
                                                        370/336
(Continued)

FOREIGN PATENT DOCUMENTS

CN     101720099 A    6/2010
CN     102547917 A    7/2012
(Continued)

*Primary Examiner* — Hanh Phan
(74) *Attorney, Agent, or Firm* — Slater Matsil, LLP

(57) ABSTRACT

This application relates to the field of communications technologies, and in particular, to a communication method in a directional communications system, and a receiver. The method of this application includes: receiving a request message; and performing directional channel listening in a direction facing a transmitter, and sending a response message if it is learned through the listening that a channel is available, or skipping sending the response message if otherwise. According to the method of this application, after receiving the request message, the receiver performs directional channel listening in the direction facing the transmitter.

14 Claims, 12 Drawing Sheets

(51) Int. Cl.
*H04B 10/079* (2013.01)
*H04B 10/116* (2013.01)
*H04W 72/04* (2009.01)

(58) Field of Classification Search
USPC ....... 398/118, 119, 127, 128, 130, 129, 131,
398/172, 115, 135, 136; 370/328, 329,
370/338, 252, 336
See application file for complete search history.

(56) References Cited

U.S. PATENT DOCUMENTS

| | | |
|---|---|---|
| 2009/0109938 A1 | 4/2009 | Singh et al. |
| 2010/0220699 A1* | 9/2010 | Gopalakrishnan ............ H04W 74/0816 370/338 |
| 2019/0029047 A1 | 1/2019 | Zhu et al. |

FOREIGN PATENT DOCUMENTS

| | | | |
|---|---|---|---|
| CN | 105049136 A | 11/2015 |
| CN | 105072690 A | 11/2015 |
| CN | 105722097 A | 6/2016 |

\* cited by examiner

COMMUNICATION METHOD IN DIRECTIONAL COMMUNICATIONS SYSTEM, COMMUNICATIONS SYSTEM, AND RECEIVER

CROSS-REFERENCE TO RELATED APPLICATIONS

This application is a continuation of International Application No. PCT/CN2018/082262, filed on Apr. 9, 2018, which claims priority to Chinese Patent Application No. 201710267249.2, filed on Apr. 21, 2017. The disclosures of the aforementioned applications are incorporated herein by reference in their entireties.

STATEMENT OF JOINT RESEARCH AGREEMENT

The subject matter and the claimed invention were made by or on the behalf of Yen Tjing Ling Industrial Research Institute, National Taiwan University, of Tamio University Road, Chiayi County, Taiwan, P. R. China and Huawei Technologies Co., Ltd., of Shenzhen, Guangdong Province, P. R. China, under a joint research agreement titled "Research & Development Agreement." The joint research agreement was in effect on or before the claimed invention was made, and that the claimed invention was made as a result of activities undertaken within the scope of the joint research agreement.

This application relates to the field of communications technologies, and in particular, to a communication method in a directional communications system, a communications system, and a receiver

BACKGROUND

In a high-frequency (for example, 60 GHz) communications system, a wavefront of an electromagnetic wave attenuates relatively rapidly. Therefore, to increase a coverage area and also effectively suppress interference, a signal is transmitted in the high-frequency communications system by using a directional transmission and directional receiving technology. The high-frequency communications system is one of directional transmission and receiving communications systems.

In the directional communications system, mutual interference exists when different transceiver devices communicate with each other. For example, FIG. 1 is a schematic diagram showing that mutual interference exists in a directional communications system. As shown in FIG. 1, in the directional communications system, a direction of transmission between a TX 1 and an RX 1 is the same as a direction of transmission between a TX 2 and an RX 2. A signal sent by the TX 2 causes interference to the RX 1, and a signal sent by the TX 1 may also cause interference to the RX 2. Assuming that the TX 1 (or the TX 2) is communicating with the RX 1 (or the RX 2), if the TX 2 (or the TX 1) fails to detect that a communication signal already exists and starts to send data, interference is caused.

To resolve the interference problem in the directional communications system, a transmit-end device first needs to listen to a channel before sending data. If it is learned through the listening that the channel is unavailable, the transmit-end device backs off; or if it is learned through the listening that the channel is available, the transmit-end device then transmits the data. However, in an existing channel listening method, a transmit-end device performs directional channel listening on a basis of omnidirectional channel listening. The following problems often exist: 1. When interference actually exists in a directional communications system, the interference cannot be learned through listening by using the existing channel listening method. As a result, the transmit-end device sends data, causing mutual interference with a transceiver device that is already in communication. 2. When interference actually does not exist in a directional communications system, it is erroneously detected by using the existing channel listening method that interference exists. As a result, the transmit-end device does not send data, causing a waste of channel resources.

SUMMARY

This application provides a communication method in a directional communications system, a system, and a receiver, to resolve problems of missing detection and erroneous detection of interference in the directional communications system.

According to an aspect, this application provides a communication method in a directional communications system, including: receiving a request message; and performing directional channel listening in a direction facing a transmitter, and sending a response message if it is learned through the listening that a channel is available.

The method further includes: skipping sending the response message if it is learned through the listening that the channel is unavailable.

Further, the performing directional channel listening in a direction facing a transmitter is specifically: scanning in the direction facing the transmitter, to detect a received signal energy value; and the sending a response message if it is learned through the listening that a channel is available is specifically: sending the response message if the detected signal energy value a preset threshold.

After the sending the response message, the method further includes: receiving data information.

Further, the request message is a request-to-send (RTS) signal, and the response message is a clear-to-send (CTS) signal.

According to another aspect, this application provides a communication method in a directional communications system, including: performing, by a transmitter, directional channel listening in a direction reverse to a direction facing a receiver, and sending a request message if it is learned through the listening that a channel is available; and receiving, by the receiver, the request message, performing directional channel listening in a direction facing the transmitter, and sending a response message if it is learned through the listening that a channel is available.

After the sending, by the receiver, a response message, the method further includes: monitoring, by the transmitter, whether the response message is received, and sending data information if the response message is received, or skipping sending the data information if the response message is not received.

After the sending, by the transmitter, data information, the method further includes: receiving, by the receiver, the data information.

Further, the performing, by a transmitter, directional channel listening in a direction reverse to a direction facing a receiver, and sending a request message if it is learned through the listening that a channel is available is specifically: scanning, by the transmitter, in the direction reverse to the direction facing the receiver to detect a received signal energy value, and sending the request message if the detected signal energy value is less than or equal to a preset threshold; and the performing, by the receiver, directional channel listening in a direction facing the transmitter, and sending a response message if it is learned through the listening that a channel is available, or skipping sending the response message if otherwise is specifically: scanning, by the receiver, in the direction facing the transmitter to detect a received signal energy value, and sending the response message if the detected signal energy value is less than or equal to a preset threshold, or skipping sending the response message if otherwise.

Further, the request message is a request-to-send RTS signal, and the response message is a clear-to-send CTS signal.

According to another aspect, this application provides a receiver, including a receptor, configured to receive a request message; a processor, configured to perform directional channel listening in a direction facing a transmitter, and if it is learned through the listening that a channel is available, trigger an emitter to send a response message; and the emitter, configured to send the response message.

Further, the performing directional channel listening in a direction facing a transmitter is specifically: scanning in the direction facing the transmitter, to detect a received signal energy value; and the sending a response message if it is learned through the listening that a channel is available is specifically: sending the response message if the detected signal energy value is less than or equal to a preset threshold.

The receptor is further configured to receive data information.

Further, the request message is a request-to-send RTS signal, and the response message is a clear-to-send CTS signal.

According to another aspect, this application provides a directional communications system, including a transmitter and a receiver, where the transmitter is configured to perform directional channel listening in a direction reverse to a direction facing the receiver, and send a request message if it is learned through the listening that a channel is available; and the receiver is configured to receive the request message, perform directional channel listening in a direction facing the transmitter, and send a response message if it is learned through the listening that a channel is available.

The transmitter is further configured to monitor whether the response message is received, and send data information if yes.

The receiver is further configured to receive the data information.

Further, the performing, by the transmitter, directional channel listening in a direction reverse to a direction facing the receiver, and sending a request message if it is learned through the listening that a channel is available is specifically: scanning, by the transmitter, in the direction reverse to the direction facing the receiver to detect a received signal energy value, and sending the request message if the detected signal energy value is less than or equal to a preset threshold; and the performing, by the receiver, directional channel listening in a direction facing the transmitter, and sending a response message if it is learned through the listening that a channel is available, or skipping sending the response message if otherwise is specifically: scanning, by the receiver, in the direction facing the transmitter to detect a received signal energy value, and sending the response message if the detected signal energy value is less than or equal to a preset threshold, or skipping sending the response message if otherwise.

Further, the request message is a request-to-send RTS signal, and the response message is a clear-to-send CTS signal.

According to the method of this application, the transmitter performs directional channel listening in the direction reverse to the direction facing the receiver; and after receiving the request message, the receiver performs directional channel listening in the direction facing the transmitter. In this way, whether a channel from the transmitter to the receiver is available can be accurately and directionally detected, thereby avoiding problems of missing detection or erroneous detection in the current system.

DETAILED DESCRIPTION OF ILLUSTRATIVE EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

This application resolves problems of missing detection and erroneous detection of interference existing in a directional communications system. A signal is transmitted in a high-frequency communications system by using a directional transmission and directional receiving technology. The high-frequency communications system is one of directional transmission and receiving communications systems. In addition to the high-frequency communications system, the directional transmission and receiving communications systems further include a visible light communications system and the like. This application sets no limitation on the directional communications system.

Figure 1:
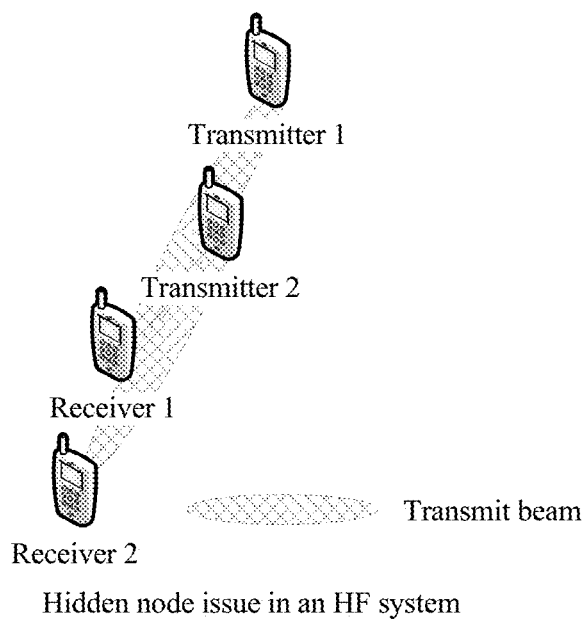
FIG. 1 is a schematic diagram showing that mutual interference exists in a directional communications system.
Figure 2:
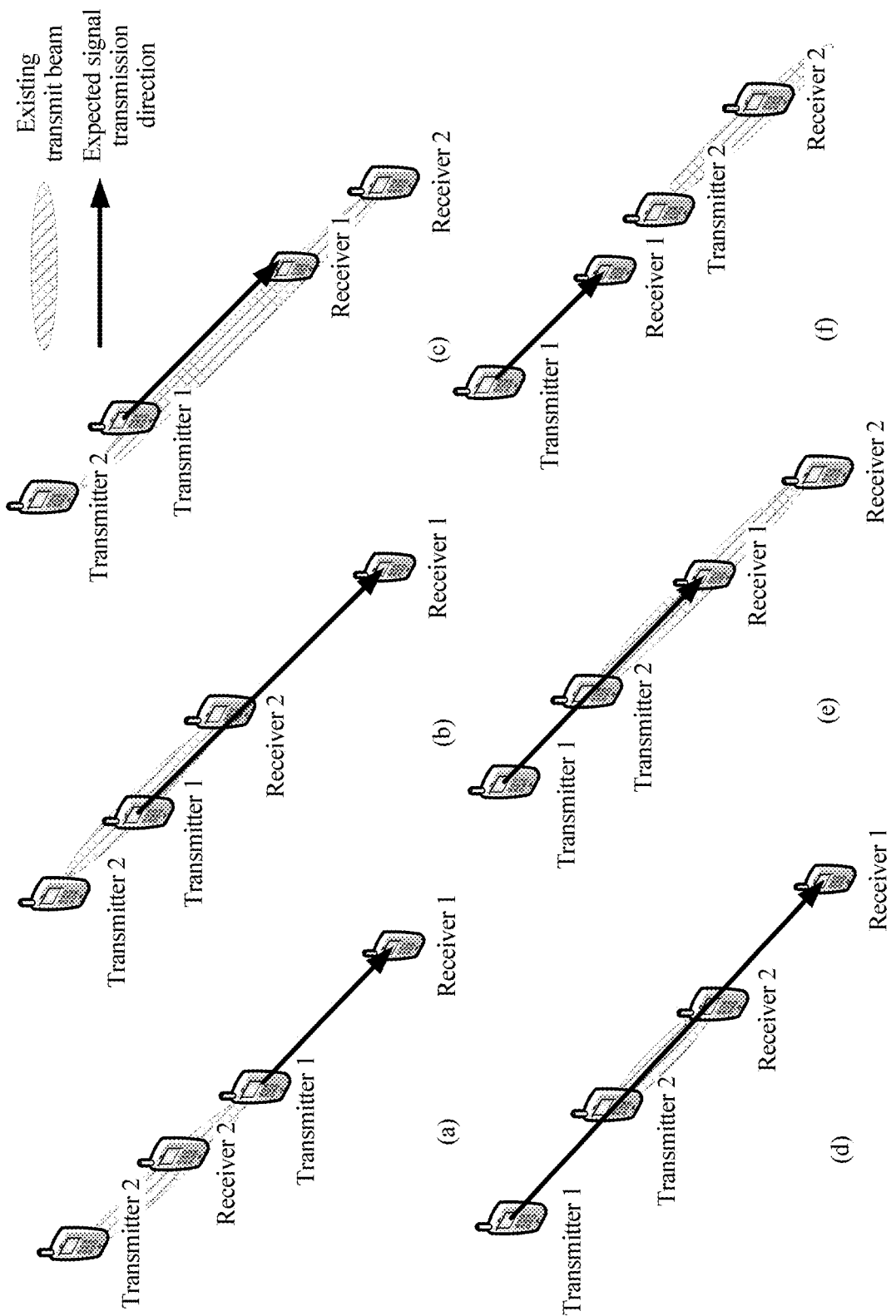
FIG. 2, FIG. 3, and FIG. 4 are diagrams of application scenarios of this application.

In the directional communications system, application scenarios to which communication devices are applied include two types:

I. Transmission directions of two groups of transceiver devices are the same, such as six scenarios shown in FIG. 2.

Figure 3:
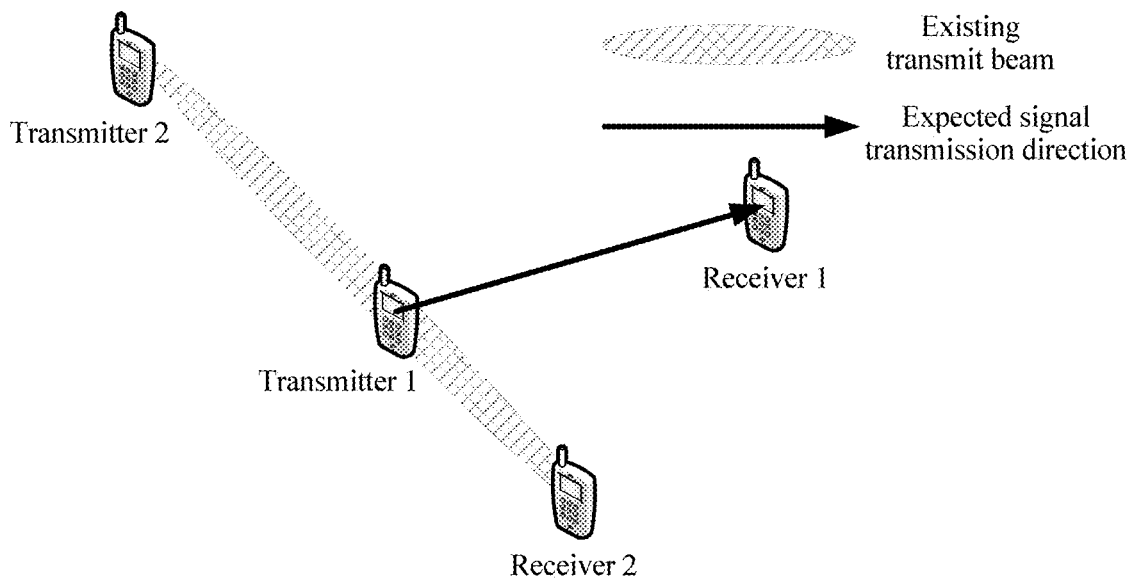
Figure 4:
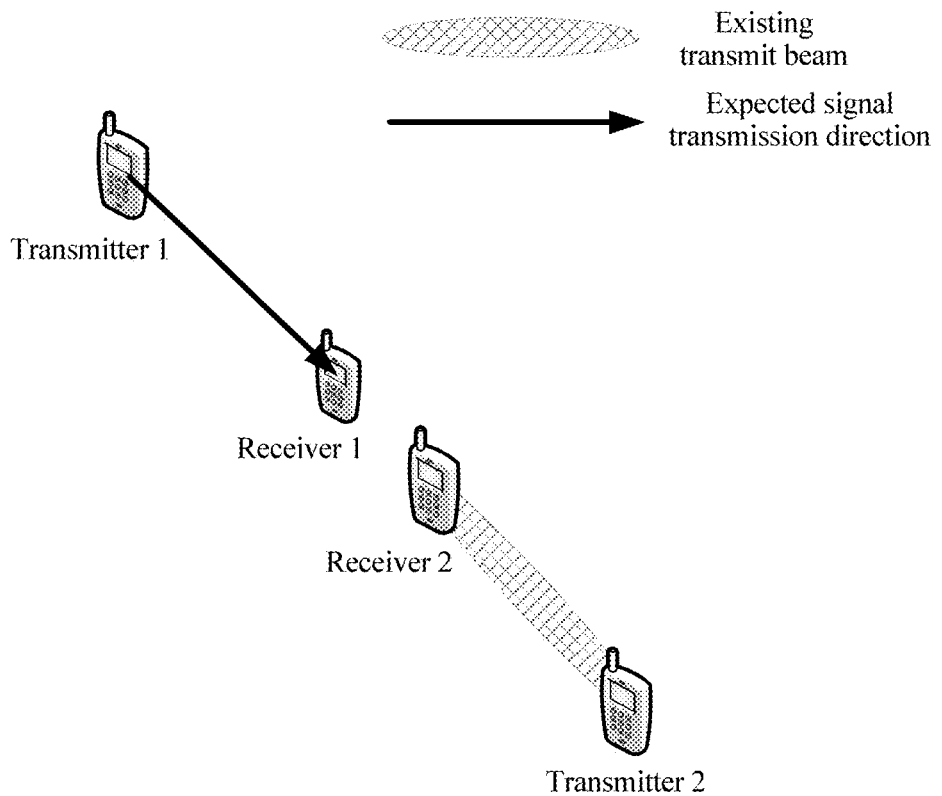

II. Transmission directions of two groups of transceiver devices are different. For example, transmission directions shown in FIG. 3 are different from each other, and transmission directions shown in FIG. 4 are reverse to each other.

A transmission direction is a direction in which a transmitter sends data to a receiver, that is, a direction from the transmitter to the receiver.

The second type of application scenario further includes two types:

1. The transmission directions of the two groups of transceiver devices are exactly reverse to each other, such as a scenario shown in FIG. 4 in which the transmission directions are reverse to each other.

2. The transmission directions of the two groups of transceiver devices are different from each other, such as a scenario shown in FIG. 3 in which the transmission directions are different from each other.

In the foregoing application scenarios, a TX 1 intends to send data to an RX 1 while a TX 2 is communicating with an RX 2.

Before sending the data to the RX 1, the TX 1 needs to perform channel listening, and the TX 1 sends the data to the RX 1 only when it is learned through the listening that a channel is available. If it is learned through the listening that the channel is unavailable, the TX 1 backs off, avoiding generating interference.

An existing channel listening method has the following problems in many cases: 1. When interference actually exists, in the existing channel listening method, the TX 1 cannot learn through the listening that the interference exists. As a result, the TX 1 sends data to the RX 1, causing mutual interference with the TX 2 and the RX 2 that are in communication. 2. When interference actually does not exist, in the existing channel listening method, the TX 1 erroneously detects that interference exists. As a result, the TX 1 does not send data to the RX 1, causing a waste of channel resources.

The following describes in detail a method and a device that are provided in this application to resolve the foregoing existing problems.

Embodiment 1

In this embodiment, a receiver needs to perform directional channel listening only in a direction facing a transmitter, to determine whether a receiving environment of a channel from the transmitter to the receiver is available.

Figure 5:
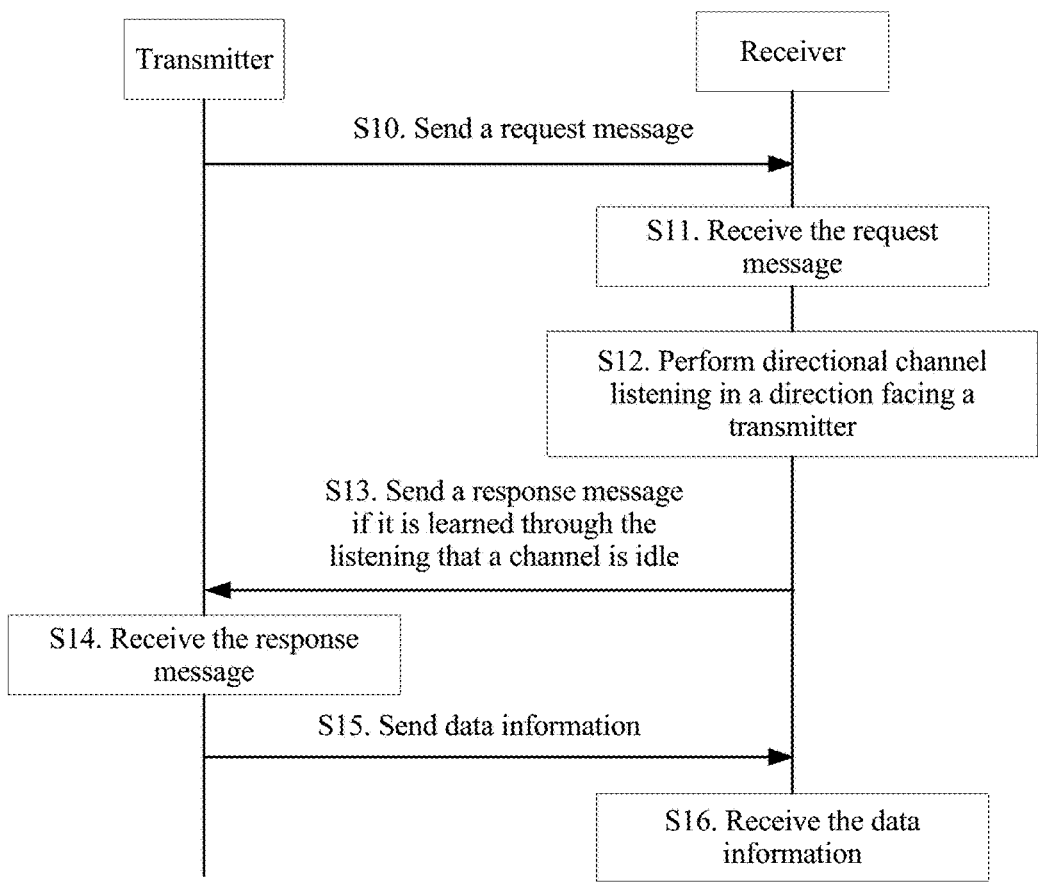
FIG. 5 is a schematic flowchart of Embodiment 1 of this application.

FIG. 5 shows a communication method in a directional communications system, including the following steps:

S10. A transmitter sends a request message.

In S10, the transmitter sends the request message to a receiver. As shown in the foregoing application scenario, the TX 1 intends to send the data to the RX 1 while the TX 2 is communicating with the RX 2. Before the TX 1 sends the data to the RX 1, the TX 1 first sends a request message to the RX 1. In a specific implementation, the request message is a request-to-send RTS signal. In other words, the TX 1 first sends the RTS signal to the RX 1.

S11. The receiver receives the request message.

In S11, if the RX 1 can receive the request message sent by the TX 1 in S10, the RX 1 performs S12. If the RX 1 cannot receive the request message sent by the TX 1 in S10, this proves that interference exists on a channel (as indicated by an arrowed line in FIG. 2) from the TX 1 to the RX 1, and the channel is unsuitable used for sending information to the RX 1 by the TX 1.

S12. The receiver performs directional channel listening in a direction facing the transmitter.

Figure 6:
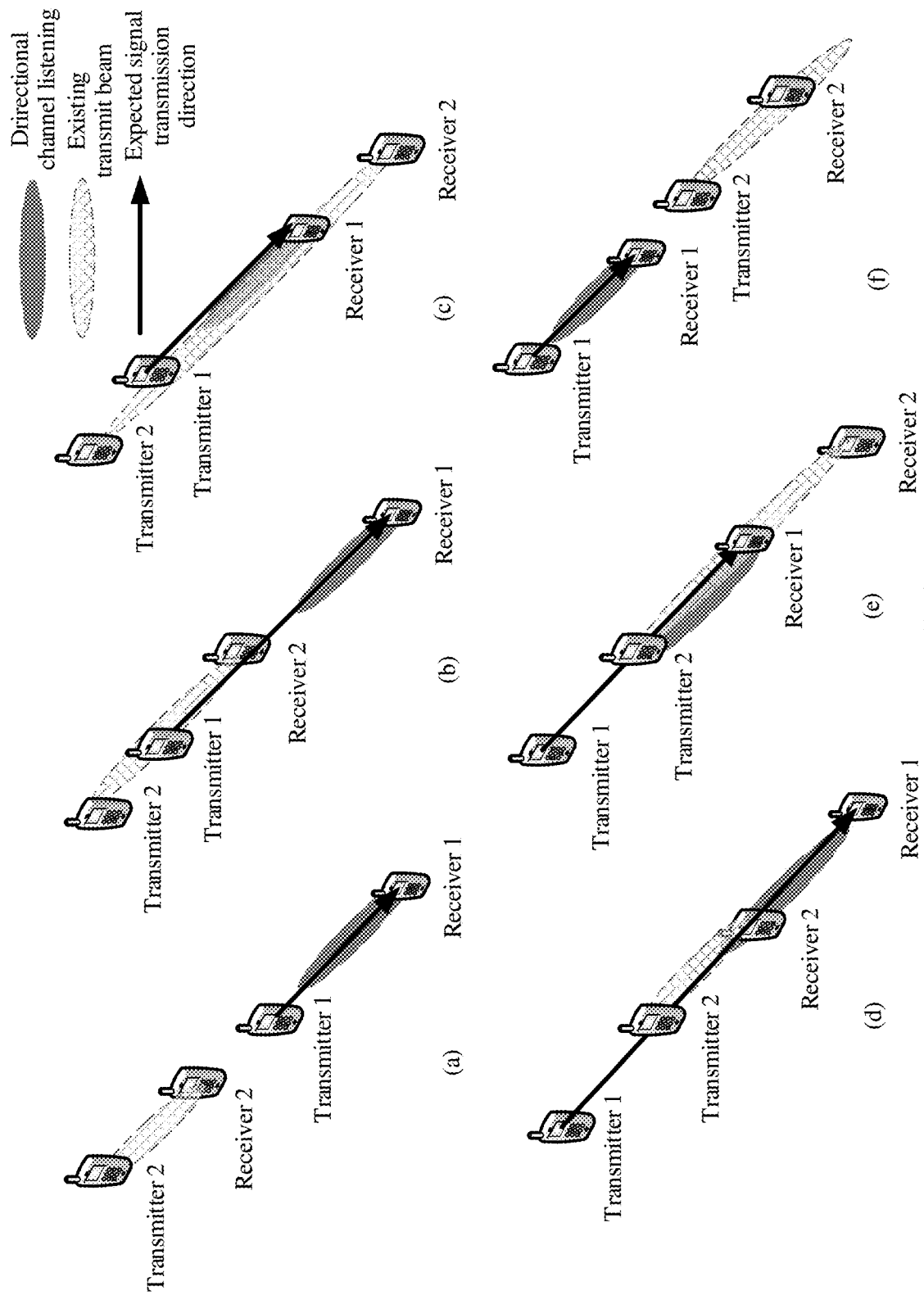
FIG. 6, FIG. 7, and FIG. 8 are schematic diagrams of applying a method of Embodiment 1 of this application to application scenarios.
Figure 7:
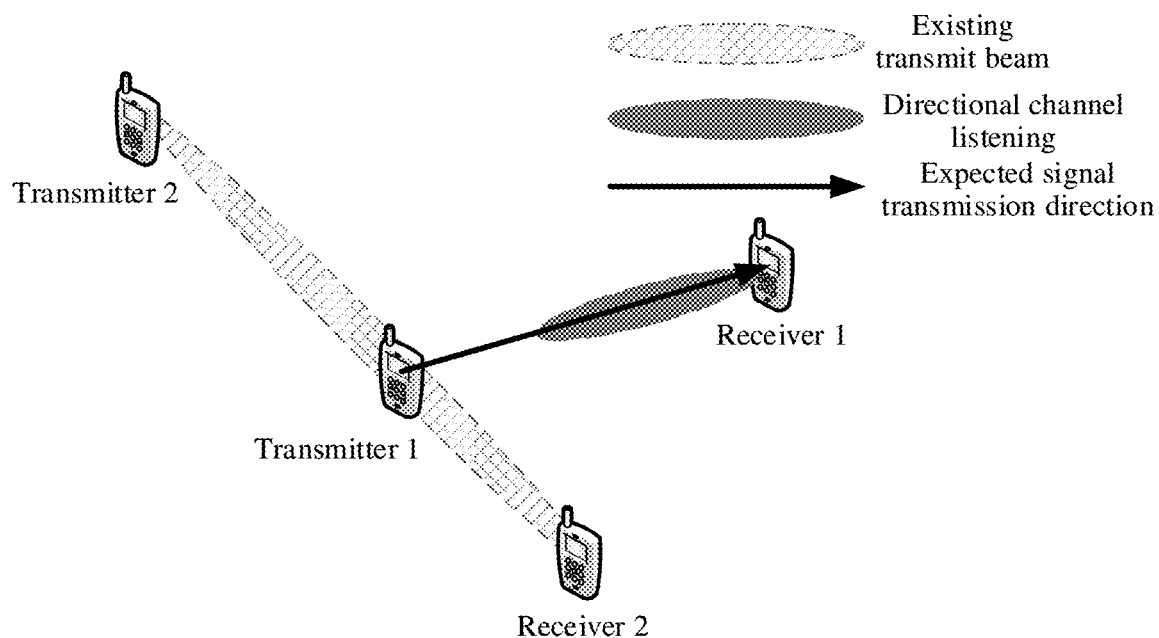
Figure 8:
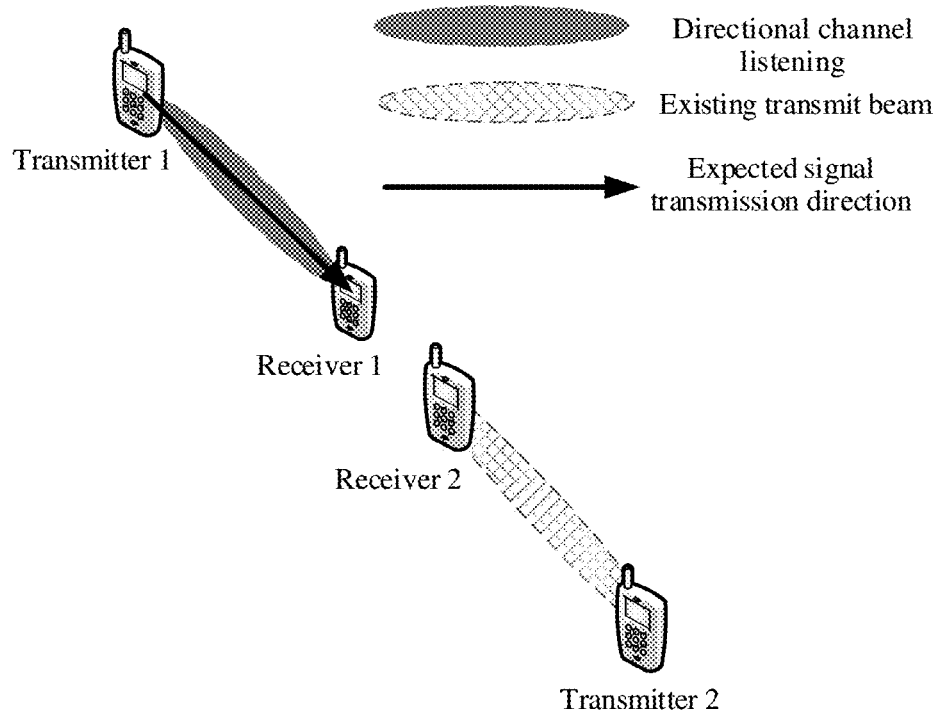

After receiving the request message in S11, the RX 1 performs, in S12, directional channel listening in a direction facing the TX 1, as indicated by shaded areas in FIG. 6, FIG. 7, and FIG. 8. In a specific implementation, that the RX 1 performs directional channel listening in a direction facing the TX 1 is specifically as follows: The RX 1 scans in the direction facing the TX 1 to detect a received signal energy value, so as to determine whether a channel from the TX 1 to the RX 1 is available.

S13. If the receiver learns through the listening that a channel is available, the receiver sends a response message.

In S13, if the RX 1 learns through the listening that the channel is available, the RX 1 sends a response message to the TX 1, so that the TX 1 further sends data information; or if the RX 1 learns through the listening that the channel is unavailable, the RX 1 does not send the response message, so that the TX 1 learns that the current channel is unavailable and is unsuitable for sending information. Specifically, a manner in which the RX 1 determines whether the channel is available may be as follows: If the signal energy value detected by the RX 1 is less than or equal to a preset threshold, the RX 1 considers that the channel is available; if the signal energy value detected by the RX 1 is greater than the preset threshold, the RX 1 considers that the channel is unavailable.

The response message sent by the RX 1 is a clear-to-send CTS signal, which matches the RTS signal in S10.

S14. The transmitter receives the response message.

When the RX 1 determines, in S13, that the channel is available, the RX 1 sends the response message to the TX 1 in S14, so that the TX 1 learns that the current channel is available.

S15. The transmitter sends data information.

In S15, when learning that the current channel is available, the TX 1 sends the data information.

S16. The receiver receives the data information.

Regardless of an application scenario to which two groups of transceiver devices are applied, whether the channel from the TX 1 to the RX 1 is available can be accurately and directionally detected by using the method of this application, and there is no problems of missing detection or erroneous detection in the current system.

Embodiment 2

On a basis of Embodiment 1, in this embodiment, a step in which "a transmitter performs directional channel listening in a direction reverse to a direction facing a receiver" is added. In this way, not only whether a receiving environment of a channel from the transmitter to the receiver is available needs to be determined, but also whether a transmission environment of a channel from the transmitter to the receiver is available needs to be determined.

Figure 9:
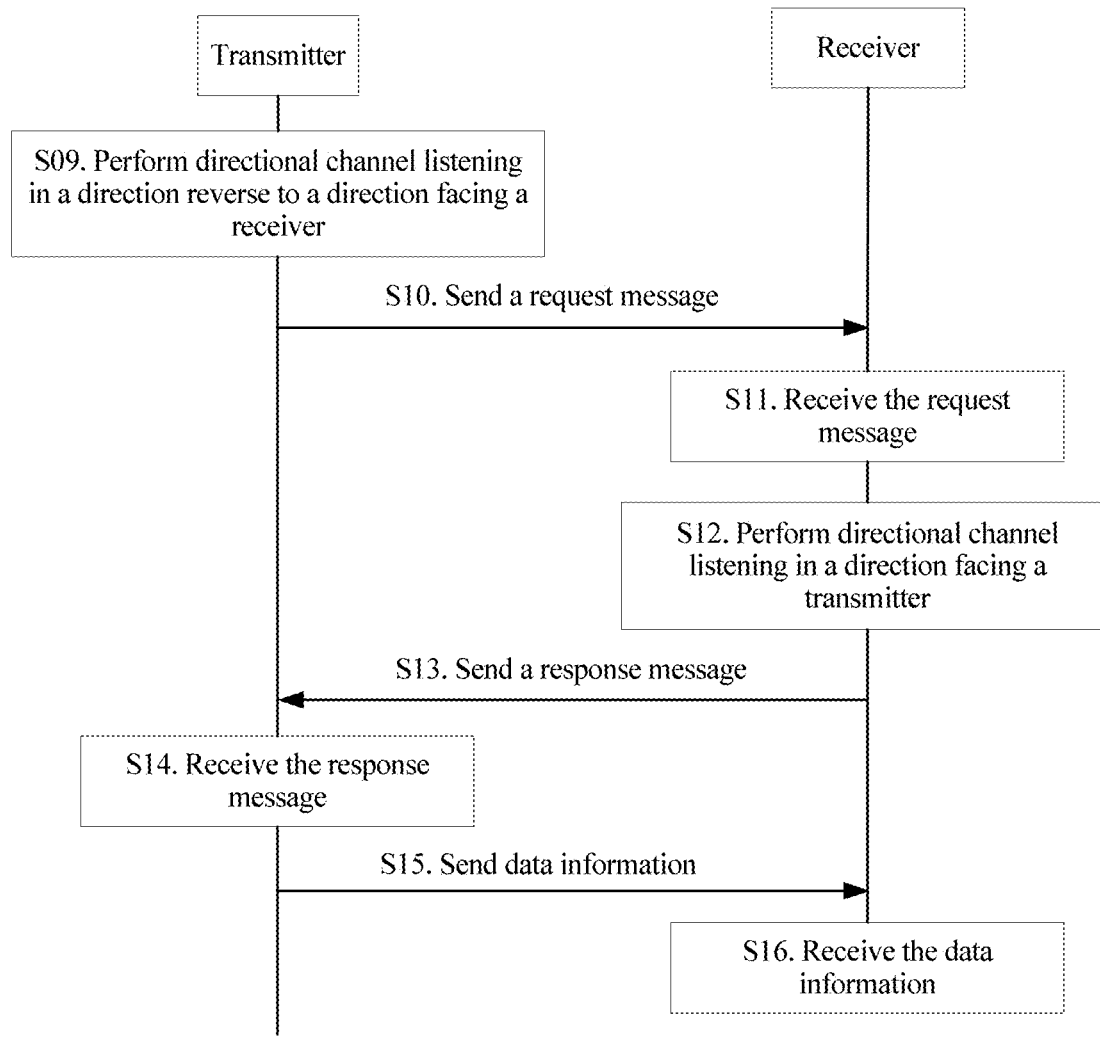
FIG. 9 is a schematic flowchart of Embodiment 2 of this application.

FIG. 9 is a schematic flowchart of Embodiment 2 of this application.

FIG. 9 shows a communication method in a directional communications system, including the following steps:

S09. A transmitter performs directional channel listening in a direction reverse to a direction facing a receiver, and performs Sin if it is learned through the listening that a channel is available.

In S09, the transmitter performs directional channel listening in the direction reverse to the direction facing the receiver, to detect whether interference exists in a transmission environment.

The performing directional channel listening in a direction reverse to a direction facing a receiver is specifically: scanning in the direction reverse to the direction facing the receiver to detect a received signal energy value. If the detected signal energy value is less than or equal to a preset threshold, the transmitter considers that a transmission environment of a channel from the transmitter to the receiver is available, and sends a request message to the receiver. If the detected signal energy value is greater than the preset threshold, the transmitter considers that the transmission environment of the channel from the transmitter to the receiver is unavailable, and does not send the request message to the receiver.

Figure 10:
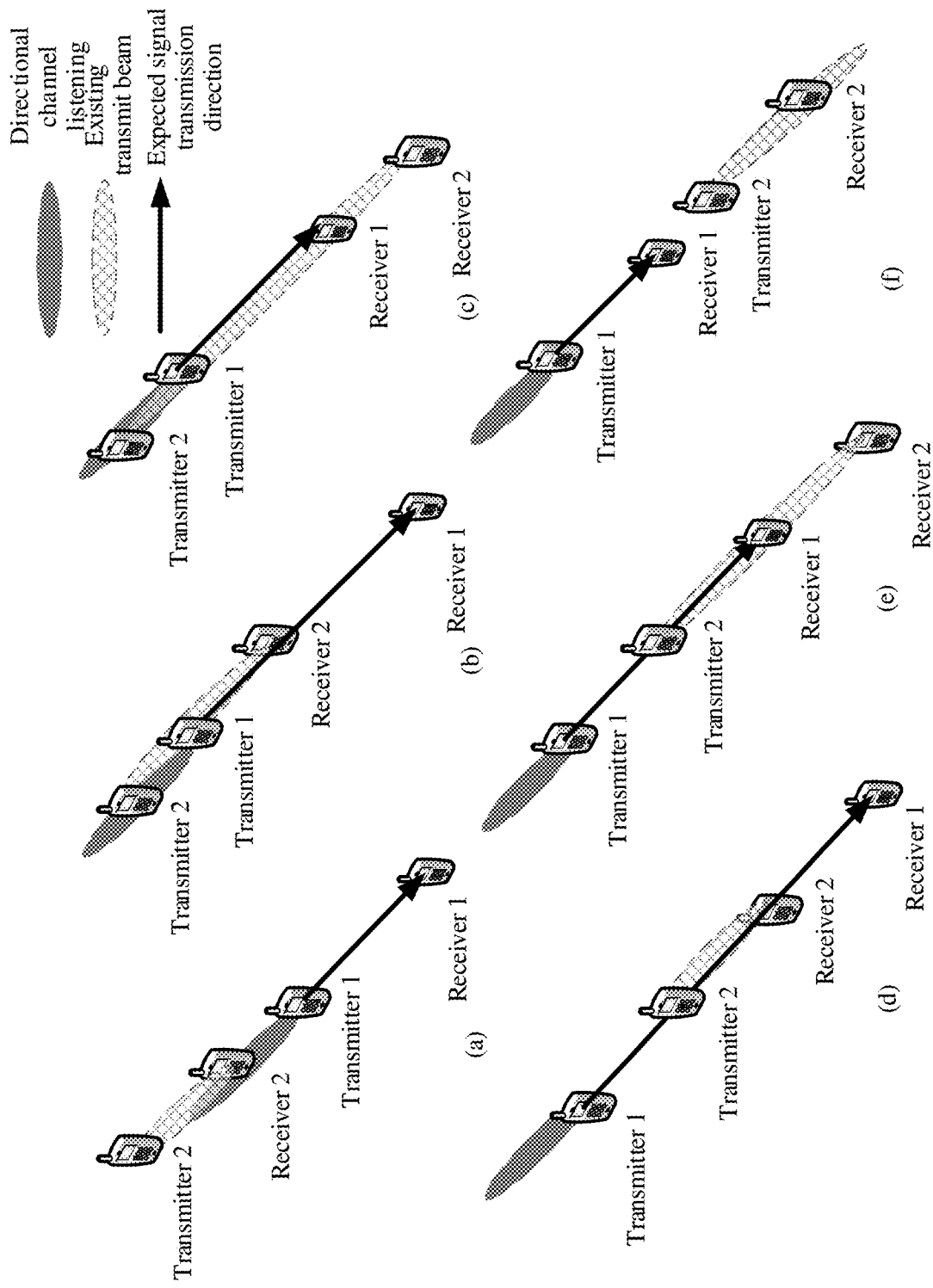
FIG. 10, FIG. 11, and FIG. 12 are schematic diagrams of applying a method of Embodiment 2 of this application to application scenarios.

As shown in FIG. 10, in three scenarios (a), (b), and (c) in FIG. 10, when a TX 2 is not far away from a TX 1, the TX 1 performs directional channel listening in a direction reverse to a direction facing an RX 1, and learns through the listening that a channel from the TX 1 to the RX 1 is unavailable. Specifically, the TX 1 considers that a transmission environment of the channel from the TX 1 to the RX 1 is unavailable, and the TX 1 does not send a request message to the RX 1.

In three scenarios (d), (e), and (f) in FIG. 10, a TX 1 performs directional channel listening in a direction reverse to a direction facing an RX 1, and learns through the listening that a channel from the TX 1 to the RX 1 is available. Specifically, the TX 1 considers that a transmission environment of the channel from the TX 1 to the RX 1 is available, and the TX 1 sends a request message to the RX 1, to trigger the RX 1 to perform directional channel listening in a direction facing the TX 1 to detect whether a receiving environment of the channel from the TX 1 to the RX 1 is available.

Figure 11:
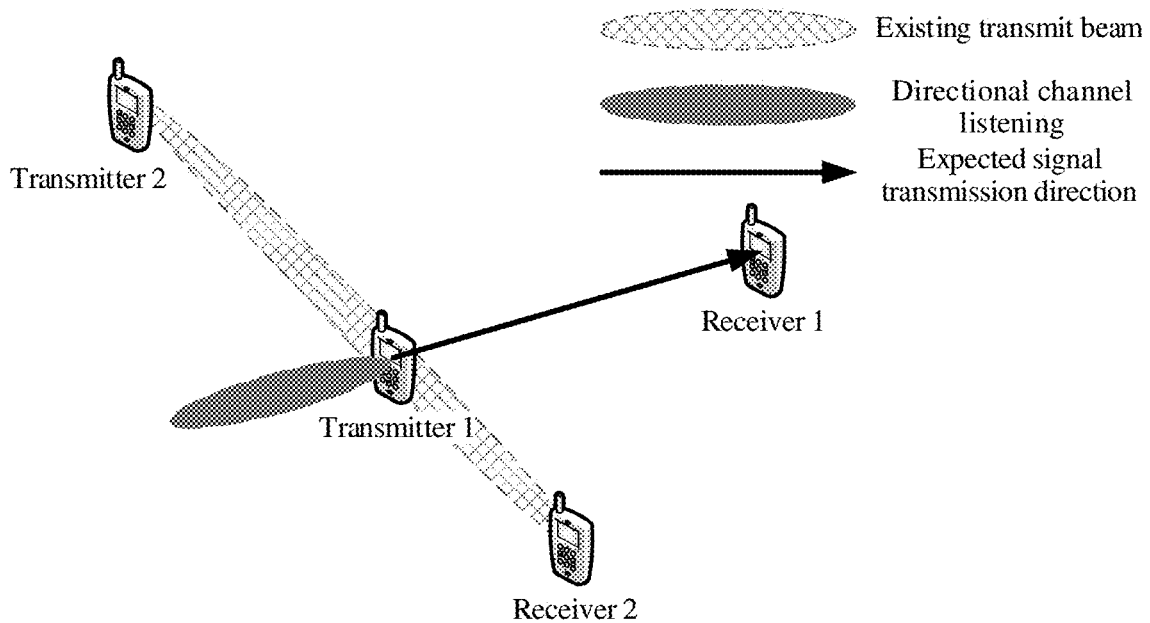
Figure 12:
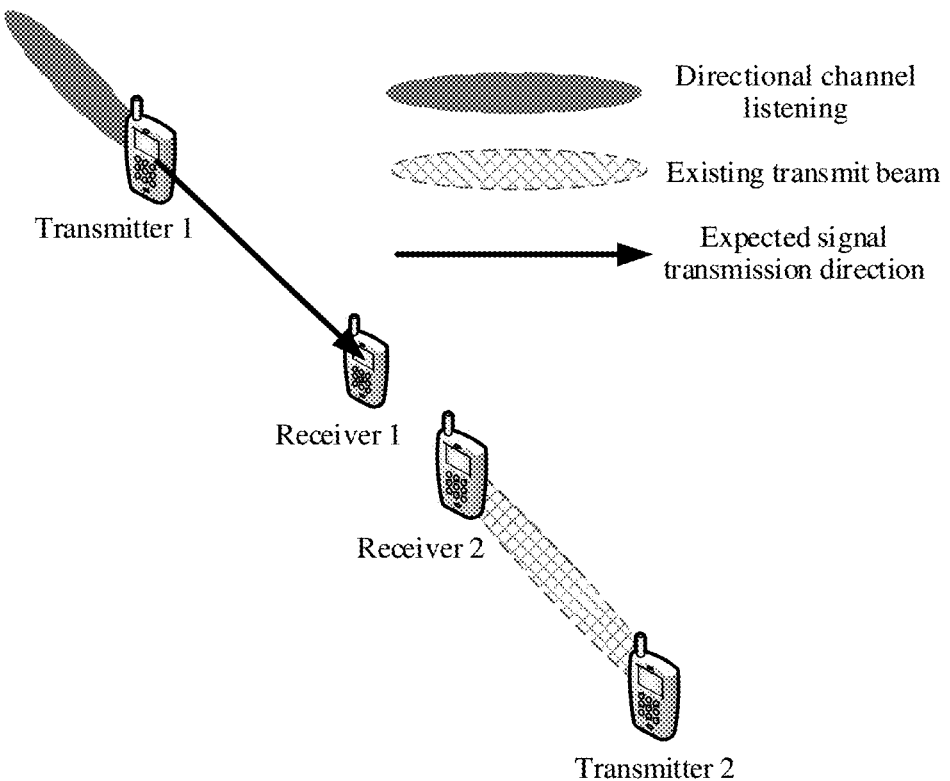

In FIG. 11 and FIG. 12, a TX 1 performs directional channel listening in a direction reverse to a direction facing an RX 1, and learns through the listening that a channel from the TX 1 to the RX 1 is available. Specifically, the TX 1 considers that a transmission environment of the channel from the TX 1 to the RX 1 is available, and the TX 1 sends a request message to the RX 1, to trigger the RX 1 to perform directional channel listening in a direction facing the TX 1 to detect whether a receiving environment of the channel from the TX 1 to the RX 1 is available.

S10. The transmitter sends the request message.

In S10, the transmitter sends the request message to a receiver. As shown in the foregoing application scenario, the TX 1 intends to send the data to the RX 1 while the TX 2 is communicating with the RX 2. Before the TX 1 sends the data to the RX 1, the TX 1 first sends a request message to the RX 1. In a specific implementation, the request message is a request-to-send RTS signal. In other words, the TX 1 first sends the RTS signal to the RX 1.

S11. The receiver receives the request message.

In S11, if the RX 1 can receive the request message sent by the TX 1 in S10, the RX 1 performs S12. If the RX 1 cannot receive the request message sent by the TX 1 in S10, this proves that interference exists on a channel (as indicated by an arrowed line in FIG. 2) from the TX 1 to the RX 1, and the channel is unsuitable for sending information to the RX 1 by the TX 1.

S12. The receiver performs directional channel listening in a direction facing the transmitter.

After receiving the request message in S11, the RX 1 performs, in S12, directional channel listening in a direction facing the TX 1. In a specific implementation, that the RX 1 performs directional channel listening in a direction facing the TX 1 is specifically as follows: The RX 1 scans in the direction facing the TX 1 to detect a size of a received signal energy value, so as to determine whether a receiving environment of the channel from the TX 1 to the RX 1 is available.

When the TX 1 determines, in S09, that the transmission environment of the channel from the TX 1 to the RX 1 is available, the RX 1 performs directional channel listening in the direction facing the TX 1, to determine whether the receiving environment of the channel from the TX 1 to the RX 1 is available. As shown in three scenarios (d), (e), and (f) in FIG. 13 and scenarios in FIG. 14 and FIG. 15, an RX 1 performs directional channel listening in a direction facing a TX 1, to determine whether a receiving environment of a channel from the TX 1 to the RX 1 is available. For specific schematic diagrams, separately refer to FIG. 13, FIG. 14, and FIG. 15.

Figure 13:
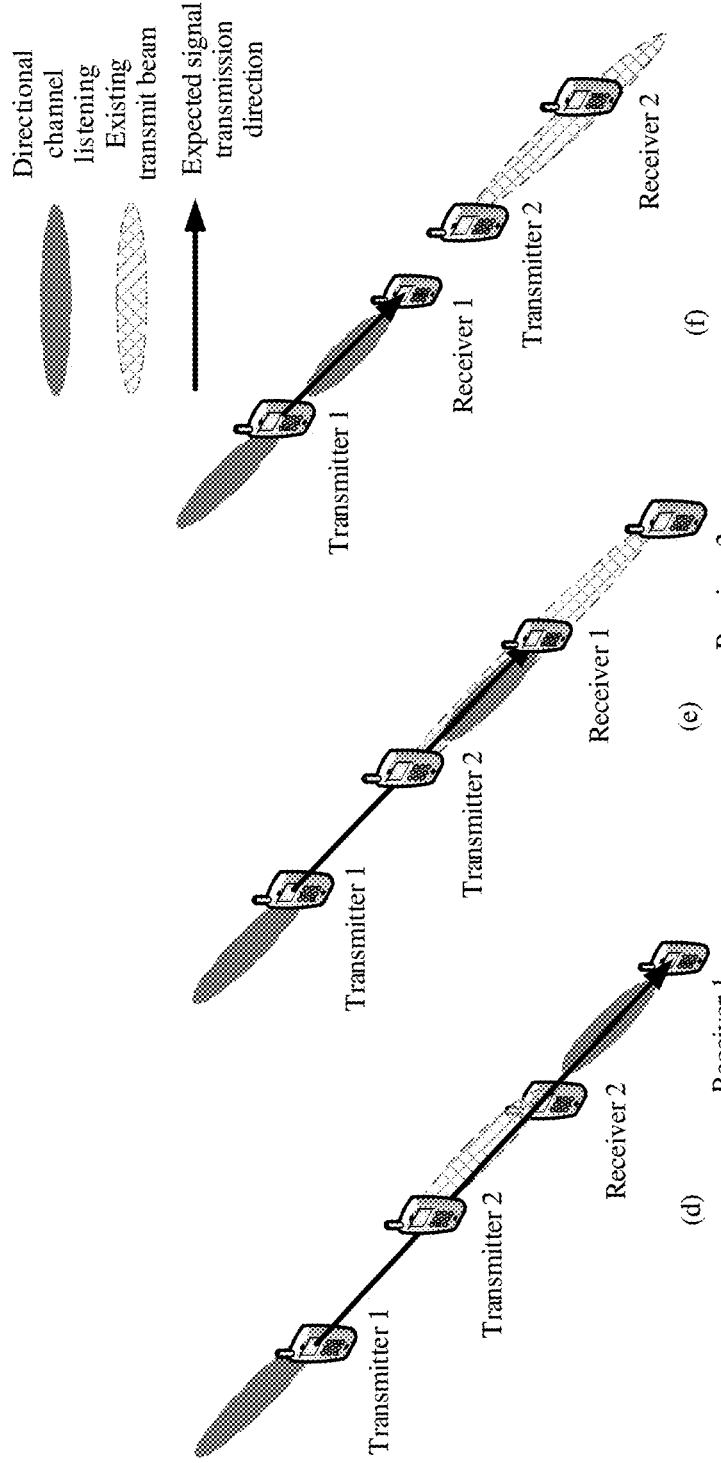
FIG. 13, FIG. 14, and FIG. 15 are other schematic diagrams of applying a method of Embodiment 2 of this application to application scenarios.

In the two scenarios (d) and (e) in FIG. 13, the RX 1 learns, through listening, of a signal sent by a TX 2 to an RX 2; and the RX 1 considers that the receiving environment of the channel from the TX 1 to the RX 1 is unavailable, and does not send a response message to the TX 1. In the scenario (f) in FIG. 13, the RX 1 does not learn, through listening, of a signal sent by a TX 2 to an RX 2; and the RX 1 considers that the receiving environment of the channel from the TX 1 to the RX 1 is available, and sends a response message to the TX 1, so that the TX 1 sends data.

Figure 14:
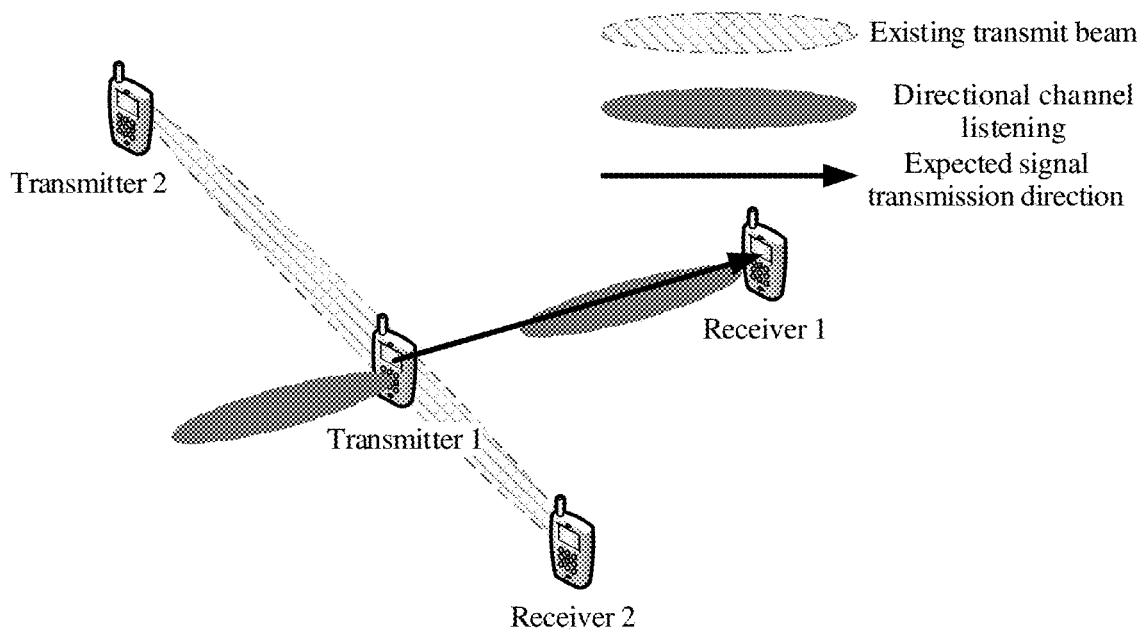
Figure 15:
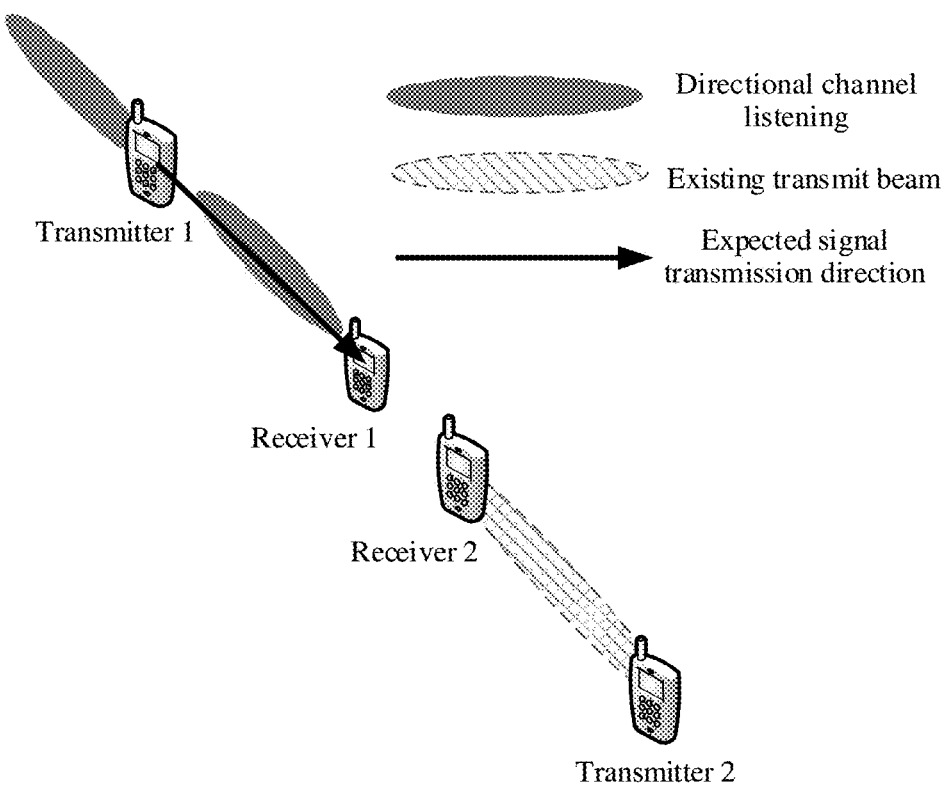

In the scenarios shown in FIG. 14 and FIG. 15, the RX 1 does not learn, through listening, of a signal sent by a TX 2 to an RX 2; and the RX 1 considers that the receiving environment of the channel from the TX 1 to the RX 1 is available, and sends a response message to the TX 1, so that the TX 1 sends data information.

S13. If the receiver learns through the listening that a channel is available, the receiver sends a response message.

In S13, if the RX 1 learns through the listening that the channel is available, the RX 1 sends a response message to the TX 1, so that the TX 1 further sends data information; or if the RX 1 learns through the listening that the channel is unavailable, the RX 1 does not send the response message. Specifically, a manner in which the RX 1 determines whether the channel is available may be as follows: If the signal energy value detected by the RX 1 is less than or equal to a preset threshold, the RX 1 considers that the channel is available; otherwise, the RX 1 considers that the channel is unavailable.

The response message sent by the RX 1 is a clear-to-send CTS signal, which matches the RTS signal in S10.

S14. The transmitter monitors whether the response message is received, and performs S15 if yes.

If the TX 1 has received the response message in S14, the TX 1 sends the data information to the RX 1; or if the TX 1 does not receive the response message in S14, the TX 1 does not send the data information.

As shown in the two scenarios (d) and (e) in FIG. 13, the TX 1 does not receive the response message, and therefore, does not send the data information. As shown in the scenario (f) in FIG. 13 and the scenarios shown in FIG. 14 and FIG. 15, the TX 1 receives the response message and sends the data information to the RX 1.

S15. The transmitter sends data information.

In S15, when the transmission environment and the receiving environment of the channel from the TX 1 to the RX 1 are both available, the TX 1 sends the data information to the RX 1.

S16. The receiver receives the data information.

In the method of this application, regardless of an application scenario to which two groups of transceiver devices in the directional communications system are applied, whether the channel from the TX 1 to the RX 1 is available can be accurately and directionally detected in this application, and there is no problems of missing detection or erroneous detection in the current system.

Embodiment 3

This embodiment describes a receiver. It should be understood that the receiver in this embodiment has any function of the receiver in the foregoing method.

Figure 16:
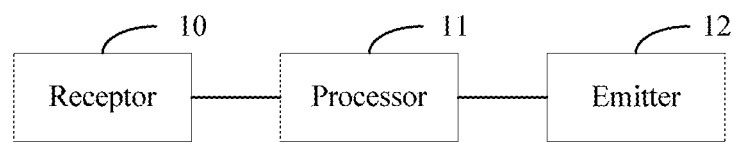
FIG. 16 is a schematic structural diagram of a receiver according to Embodiment 3 of this application.

FIG. 16 is a schematic structural diagram of a receiver according to this application.

FIG. 16 shows a receiver, including a receptor 10, a processor 11, and an emitter 12.

The receptor 10 is configured to receive a request message.

In a specific implementation, the request message is a request-to-send RTS signal.

The receptor 10 is configured to receive data information.

The receptor 10 is further configured to: when a transmitter sends data information, receive the data information.

The processor 11 is configured to: perform directional channel listening in a direction facing the transmitter; and if it is learned through the listening that a channel is available, trigger the emitter 12 to send a response message; or if otherwise, skip triggering the emitter 12 to send the response message.

In an implementation, the performing directional channel listening in a direction facing a transmitter is specifically: scanning in the direction facing the transmitter to detect a received signal energy value; and if the detected signal energy value is less than or equal to a preset threshold, triggering the emitter 12 to send the response message; or if otherwise, skipping triggering the emitter 12 to send the response message.

The emitter 12 is configured to send the response message.

The response message is a clear-to-send CTS signal.

After receiving the request message, the receiver in this embodiment performs directional channel listening in the direction facing the transmitter, to determine whether a receiving environment of the channel is available.

Embodiment 4

This embodiment describes a directional communications system. It should be understood that a transmitter and a receiver in this embodiment have any functions of the corresponding devices in the method in Embodiment 2.

Figure 17:
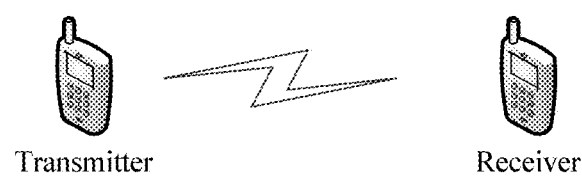
FIG. 17 is a schematic diagram of a system structure of a directional communications system according to Embodiment 4 of this application.

FIG. 17 is a schematic diagram of a system structure of a directional communications system according to Embodiment 4 of this application.

As shown in FIG. 17, the directional communications system includes a transmitter and a receiver.

The transmitter is configured to perform directional channel listening in a direction reverse to a direction facing the receiver, and send a request message if it is learned through the listening that a channel is available; and the receiver is configured to receive the request message, perform directional channel listening in a direction facing the transmitter, and send a response message if it is learned through the listening that a channel is available.

The transmitter is further configured to monitor whether the response message is received, and send data information if yes.

The receiver is further configured to receive the data information.

Further, the performing, by the transmitter, directional channel listening in a direction reverse to a direction facing the receiver, and sending a request message if it is learned through the listening that a channel is available is specifically: scanning, by the transmitter, in the direction reverse to the direction facing the receiver to detect a received signal energy value, and sending the request message if the detected signal energy value is less than or equal to a preset threshold; and the performing, by the receiver, directional channel listening in a direction facing the transmitter, and sending a response message if it is learned through the listening that a channel is available, or skipping sending the response message if otherwise is specifically: scanning, by the receiver, in the direction facing the transmitter to detect a received signal energy value, and sending the response message if the detected signal energy value is less than or equal to a preset threshold, or skipping sending the response message if otherwise.

Further, the request message is a request-to-send RTS signal, and the response message is a clear-to-send CTS signal.

In the directional communications system according to this embodiment, the transmitter determines whether a transmission environment of a channel from the transmitter to the receiver is available, and the receiver determines whether a receiving environment of the channel from the transmitter to the receiver is available. Regardless of an application scenario to which two groups of transceiver devices in the directional communications system are applied, whether a channel from a transmitter TX 1 to a receiver RX 1 is available can be accurately and directionally determined in this application, and there is no problems of missing detection or erroneous detection in the current system.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process according to, for example, a signal having one or more data packets (for example, data from one component interacting with another component in a local system, a distributed system, and/or across a network such as the Internet interacting with other systems by using the signal).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
    receiving, by a device in a directional communications system, a request message from a transmitter;
    in response to receiving the request message, performing, by the device, directional channel listening in a direction facing the transmitter; and
    in response to learning through the directional channel listening that a channel is available, sending, by the device, a response message to the transmitter.

2. The method according to claim 1, wherein the method further comprises:
    in response to learning through the directional channel listening that the channel is unavailable, skipping sending the response message.

3. The method according to claim 2 wherein:
    performing the directional channel listening in the direction facing the transmitter comprises scanning in the direction facing the transmitter to detect a received signal energy value; and
    sending the response message in response to learning through the directional channel listening that the channel is available comprises sending the response message in response to the received signal energy value being less than or equal to a preset threshold.

4. The method according to claim 1, wherein after sending the response message, the method further comprises: receiving data information.

5. The method according to claim 1, wherein the request message is a request-to-send (RTS) signal, and the response message is a clear-to-send (CTS) signal.

6. A device, comprising:
    a processor; and
    a non-transitory computer-readable storage medium storing a program to be executed by the processor, the program, when executed by the processor instructs the device to:
        receive a request message from a transmitter;
        in response to receiving the request message, perform directional channel listening in a direction facing the transmitter;
        in response to learning through the direction channel listening that a channel is available, trigger an emitter to send a response message; and
        send the response message to the transmitter.

7. The device according to claim 6, wherein the program, when executed by the processor instructs the device to:
    scan in the direction facing the transmitter to detect a received signal energy value, wherein the program to send the response message in response to learning through the direction channel listening that the channel is available comprises program to send the response message when the received signal energy value is less than or equal to a preset threshold.

8. The device according to claim 6, wherein the program, when executed by the processor instructs the device to receive data information.

9. The device according to claim 6, wherein the request message is a request-to-send (RTS) signal, and the response message is a clear-to-send (CTS) signal.

10. A system, comprising:
    a first device in a directional communications system, the first device comprising:
        a first processor; and
        a first non-transitory computer-readable storage medium storing a first program to be executed by the first processor, the first program including first instructions for:
            performing directional channel listening in a direction reverse to a direction facing a second device in the directional communications system; and
            in response to learning through the directional channel listening in the direction reverse to the direction facing the second device that a channel is available, send a request message to the second device; and
    the second device in the directional communications system, the second device comprising:
        a second processor; and
        a second a non-transitory computer-readable storage medium storing a second program to be executed by the second processor, the second program including second instructions for:
            receive the request message;
            in response to receiving the request message, perform directional channel listening in a direction facing the first device; and
            in response to learning through the directional channel listening in the direction facing the first device that a channel is available, send a response message to the first device.

11. The system according to claim 10, wherein the first instructions includes further instructions to:
    monitor whether the response message is received; and
    send data information when the response message is received.

12. The system according to claim 11, wherein the second instructions include further instructions to receive the data information.

13. The system according to claim 10, wherein:
    the first instructions comprise instructions to:
        scan in the direction reverse to the direction facing the second device to detect a first received signal energy value; and
        send the request message when the first received signal energy value is less than or equal to a first preset threshold; and
    the second instructions comprise instructions to:
        scan in the direction facing the first device to detect a second received signal energy value; and
        in response to detecting the second received signal energy value:
            send the response message to the first device when the second received signal energy value is less than or equal to a second preset threshold; or
            skipping sending the response message to the first device when the second received signal energy value is greater than the second preset threshold.

14. The directional communications system according to claim 10, wherein the request message is a request-to-send (RTS) signal, and the response message is a clear-to-send (CTS) signal.

* * * * *